United States Patent [19]

Mazanek et al.

[11] Patent Number: 5,137,766

[45] Date of Patent: Aug. 11, 1992

[54] METAL FIBRE-CONTAINING COMPOSITE MATERIALS AND USE THEREOF FOR PRODUCING MOULDINGS FOR SCREENING AGAINST ELECTROMAGNETIC RADIATION

[75] Inventors: Jan Mazanek, Cologne; Gerd Goldmann, Krefeld; Ulrich von Gizycki, Leverkusen; Henning Giesecke, Cologne, all of Fed. Rep. of Germany

[73] Assignee: Bayer Aktiengesellschaft, Leverkusen, Fed. Rep. of Germany

[21] Appl. No.: 323,644

[22] Filed: Mar. 15, 1989

[30] Foreign Application Priority Data

Mar. 29, 1988 [DE] Fed. Rep. of Germany ....... 3810598

[51] Int. Cl.$^5$ .............................................. B32B 1/04
[52] U.S. Cl. ................... 428/68; 174/35 R; 264/135; 264/328.1; 428/74; 428/294; 428/297; 428/373; 428/902
[58] Field of Search ........................... 264/135, 328.18; 428/68, 74, 294, 297, 373, 902; 174/35 R

[56] References Cited

FOREIGN PATENT DOCUMENTS

| 0131067 | 1/1985 | European Pat. Off. . |
|---------|--------|----------------------|
| 0283844 | 9/1988 | European Pat. Off. . |
| 0286168 | 10/1988 | European Pat. Off. . |
| 0306671 | 3/1989 | European Pat. Off. . |
| 2186833 | 8/1987 | United Kingdom . |

*Primary Examiner*—James J. Bell
*Attorney, Agent, or Firm*—Sprung Horn Kramer & Woods

[57] ABSTRACT

To produce mouldings for screening against electromagnetic radiation it is highly advantageous to use metal fibre-containing composite materials as obtained by impregnating a bundle of continuous metal filament fibres with a polymeric adhesion-promoting substance, sheathing the resulting compact precursor with a thermoplastic matrix and cutting the resulting extrudate of composite material into defined lengths.

The composite materials can be used as such or together with thermoplastic granules.

10 Claims, 2 Drawing Sheets

METAL FIBRE-CONTAINING COMPOSITE MATERIALS AND USE THEREOF FOR PRODUCING MOULDINGS FOR SCREENING AGAINST ELECTROMAGNETIC RADIATION

The materials used for the housings of electric and electronic equipment today are usually plastics. Plastics, not being electrically conductive, are generally substantially transparent to electromagnetic radiation. The operation of such equipment frequently gives rise to the unintentional generation of high-frequency signals and/or equipment of this type is sensitive to interference from outside electromagnetic radiation.. In particular the substantial miniaturisation of electronic components has sharply increased their sensitivity to interference from outside radiation. Effective protection against electromagnetic radiation is thus of supreme importance.

Another sign of this development is that there are already a number of national regulations (FCC, EEC, VDE, DIN) which put a limit on the interference field intensities produced. Even today a number of measures are used to confer a screening effect on plastics parts. Examples are the chemical and physical metallization of the surfaces, the application of conductive surface coatings and the flame deposition process. Similarly, the admixture of screening additives to plastics has been tried for some time, even commercially. Examples are additions of steel fibres, carbon fibres, metal flakes, metal powders and metallized fibres. A universally applicable inexpensive method for screening plastics housings has not been found to date. Metallization-based methods have hitherto been handicapped by their high cost caused by many process steps and hence high capital investment requirements. Moreover, the metal surfaces produced are either to sensitive or too unattractive, so that they need to be covered with an additional coat of varnish.

Nor has the admixture of screening additives become established to date. The chief reasons for this have been either the high cost of the additives, the high quantities of additives and the attendant impairment of the mechanical characteristics of the plastics materials and the impairment of surface quality, nonuniformity in the distribution of the fillers in the plastics or the impairment of the screening effect of the fillers by the method of processing.

In the context of electromagnetic screening it is important to specify which frequency ranges and which components of the electromagnetic field have to be screened against to what extent. While screening against high-frequency fields (the GHz range) in the distant field and the screening against electric component of low-frequency fields in the near field are still relatively easy to accomplish, it is in particular the screening against the magnetic component of low-frequency fields (the MHz range) in the near field which presents difficult technical problems.

There has therefore been no shortage of attempts to equip thermoplastic materials with screening fillers in such a way that housing parts injection-moulded therefrom give an adequate screening effect.

Such attempts are described for example in the following patent publications: JP-A-58/176,220, JP-A-61/057,626, JP-A-60/054,967, JP-A-61/100,415, JP-A-60/134,500, JP-A-62/860,53, JP-A-61/152,766, JP-A-62/96,564, JP-A-60/248,119, JP-A-59/109,537, JP-A-59/499,133, JP-A-58,104,907, U.S. Pat. No. 4,664,971, U.S. Pat. No. 4,500,595, EP-A-112,197, EP-B-131,067.

However, all the prior art processes have one or more of the disadvantages mentioned hereinafter, which in particular could not permit the incorporation of high proportions of metal fibres and/or the use of the injection mouldings at low frequencies, in particular in the magnetic near field. Examples are:

wear and tear of machines during injection moulding,
blocking of dies, in particular with increasing metal fibre content,
nonuniform distribution of the fibres in moulding,
high cost,
in the case of mixtures of masterbatches and plastics granules problems with the exact metering of the metal fibres and
insufficient fibre diameter and the associated increased comminution during injection moulding.

It has now been found, surprisingly, that all or some of these disadvantages can be overcome by using in the production of mouldings by injection moulding composite materials which contain substantially parallel-aligned metal fibres and which are obtained by impregnating a bundle of continuous metal filament fibres having an average diameter of 35–200 µm with a polymeric adhesion-promoting substance, sheathing the resulting compact precursor with a thermoplastic matrix and cutting the resulting extrudate of composite material into defined lengths.

The lengths of the sections of composite material are 1–70, preferably 2–40, particularly preferably 3–20, mm.

Metal fibres are to be understood as meaning metallically conducting continuous filament fibres, wires and rods. The fibres can be present in the form of individual fibres, rovings, strands, yarns, threads, braids or ropes. Metal fibres suitable for use according to the invention are in particular those which have a specific electric resistance of below $5 \times 10^6 \Omega$ cm. Examples are the following materials: aluminium, gold, silver and in particular copper and also alloys thereof with other metals, in which case the individual fibre may also be constructed layer by layer from different metals.

It is also possible to use soft-magnetic metals, such as iron, nickel, cobalt and alloys thereof.

The term metal fibres is also to be understood as meaning fibres composed of two or more metals and formed for example by electrolytically applying a coat of metal on top of a core of another metal. Even combinations of metals and nonconductors are included.

It is similarly possible to use any desired combinations of fibres of different metals, of metals and metallized fibres or of metals and carbon and/or graphite fibres or of metals and nonconductors. The metals and/or other fibres can have identical or different diameters. It is of course also possible to produce a precursor from metal fibres and nonconductive fibres.

Continuous filament fibres is to be understood here as meaning that the starting materials have long supply lengths which are taken off continuously. The minimum length should be 50 meters. The diameter of the metal fibres is preferably 40–100 µm, particularly preferably 40–80 µm.

To impregnate the metal fibres it is possible to use thermosetting plastics, elastomers, thermoplastics or other polymers. Thermoplastics, however, are particularly suitable. Examples of polymers to be used according to the invention are:

olefine and polyolefine homopolymers, graft polymers and copolymers, for example polyethylene, polypropylene, polybutene, polyisobutylene, PVC, ethylene vinyl acetate polymers, fluorine-containing polymers, polyacetals, polystyrene, styrene copolymers, aromatic, aliphatic and mixed polyesters, polyamides and polyimides, polybenzhydantoins, polyethers, polycarbonates, polyurethanes, polyureas and other polymers obtainable by the polyisocyanate polyaddition process, acrylic ester/styrene copolymers, styrene-butadiene and styrene-butadiene-N-vinylpyridine copolymers, chlorobutadiene and polybutadiene (co)polymers, butadiene-acrylonitrile polymers, carboxylated styrene-butadiene copolymers, chloroprene (co)polymers, styrene-acrylonitrile polymers, polyacrylates, polyphenylene oxide, polysulphides, PPS, polysulphones, polyethane sulphones, cellulose esters, amino resins, phenolic resins, epoxy resins and alkyd resins of various compositions and the like. They can be used not only without a solvent or diluent but also in solutions or as dispersions. Even blends or mixtures of these polymers are possible without restriction.

The polymers may also contain further additives such as plasticizing agents, antioxidants, mould release agents, waxes or other polymer additives as described for example in E. W. Flick: Plastics Additives, Noyes Publications, Park Ridge, N.J., USA.

The composite materials according to the invention are preferably prepared in a novel manner where first of all a structure composed of thin continuous metal filament fibres is thoroughly impregnated with a polymer to form a compact linear or sheetlike precursor, and then sheathing or coating this precursor with a thermoplastic and subsequently comminuting.

To produce the precursor, the continuous filament fibres may be present in the form of one or more approximately parallel-lined round or flat bundles, as sheetlike structures containing approximately parallel-lined fibres or as textile structures. Such textile structures are for example woven fabrics, knitted fabrics, graded fabrics or laid fabrics.

If individual fibres or wires are introduced into the impregnating device in a parallel arrangement, a prior processing of the fibres into warp beams by direct or section warping is advantageous.

Suitable methods of impregnating the fibre structure differ according to the manner of application of the polymer. In the case of thermoplastics, the plastic can be applied from the melt, from solutions or suspensions, in the form of powders, films, fibres or film tapes or by in-situ polymerization. Thermosetting plastics are applied to the fibres in the form of highly fluid reactive systems and then crosslinked. Even impregnating with elastomer latices is possible.

The plastic may be applied all at once or divided in a plurality of portions applied in succession. It is also possible to introduce various portions of the same thermoplastic in different forms, for example a first portion from a solution and, after the solvent has been removed, a second portion from a melt. Similarly, it is also possible to apply different plastics in succession, for example first an elastomer layer from the latex and then a thermoplastic layer from the melt.

In another process, the pins 6 do not dip directly into the melt but are coated with thermoplastic melt which is then incorporated by the pins into the metal fibre structure.

The precursor extrudate emerging from the shaping die 7 preferably has a round or rectangular cross-section. In the case of a round cross-section, diameters between 1 and 5 mm are advantageous, while in the case of a rectangular cross-section widths between 3 and 10 mm and heights between 0.2 and 3 mm are advantageous.

Figure 2A:
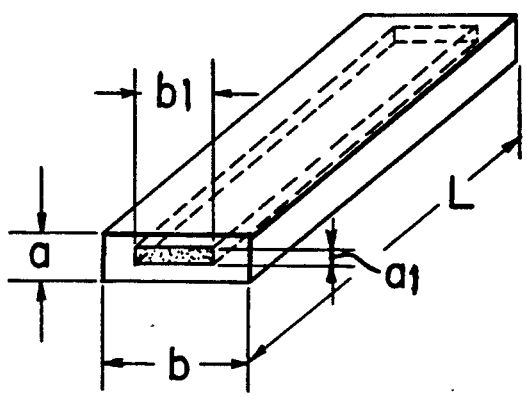
Figure 2B:
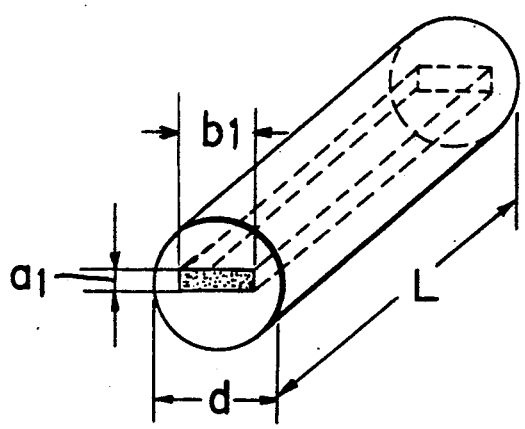

In FIG. 2A, the letter $a = 3-5$ mm, $b = 3-10$ mm, $a_1 = 0.5-2$ mm, $b_1 = 3-8$ mm and $L = 5-15$ mm; in FIG. 2B, the letter $a_1 = 0.5-2$ mm, $b_1 = 3-8$ mm; $d = 3-10$ mm and $L = 5-15$ mm.

In a next process step the precursor ribbon produced is sheathed with a thermoplastic polymer.

If the sheathing is done with the same thermoplastic as applied last to the precursor, the sheathing is preferably carried out directly inside the shaping die 7 because the die orifice corresponds to the desired dimensions of the composite material according to the invention. The metal fibres are then passed through the die orifice in such a way that they lie at the centre of the emerging extrudate. The sheathing may also take place in a completely independent step by applying the thermoplastic to the ready-produced precursor 12 in the manner of a cable sheathing in a cross head or similar systems between shaping die 7 and ribbon take-off system 10.

If the thermoplastic used in the sheathing differs from the matrix material of the precursor, the sheathing may be carried out either in the manner of a coextrusion directly in the shaping die 7 or in a downstream sheathing of the precursor.

The ribbon of composite material produced is either cut at once into sections of desired lengths of 1-70, preferably 3-40, particularly preferably 5-20, mm or rolled up and stored in a continuous ribbon form.

Using this process it is also possible to produce wide, sheetlike precursor webs by widening the melt-filled chamber 6 and also the pins 6 and the dies 4 and 7. The precursor web may also run off from the last pin without a die. In this manner it is possible to produce sheetlike structures of up to 2,000 mm in width, preferably of 2-1,000 mm, particularly preferably of 4-100 mm, in width. Aside from wide parallel fibre bundles it is also possible to process the textiles mentioned, preferably woven or knitted fabrics.

From these sheetlike precursor webs the composite material according to the invention is obtained by coating on one or preferably both sides or by enveloping and subsequent comminution.

The coating can be effected either directly in the shaping die 7 or by subsequent overlaying with a melt ribbon from a strip die of an extruder or by applying films, powders, solutions or polymerization-capable monomer systems.

In a particularly economical process for producing large quantities of the composite material is the production on double-belt presses, in particular if the matrix material of the precursor consists at least partly of thermoplastic material. It is then possible for the impregnation of the precursor and the coating to take place in a single step.

The two similar or different thermoplastics can preferably be pulled in the form of films into the double-belt press together with the metal fibre structure.

Preferance is also given to a process where the metal fibre structure is overlaid with a melt film of a thermoplastic impregnating the precursor. This web is covered on one or preferably both sides with one or more films of the coating thermoplastic and pulled directly into the slot of a double-belt press together with the metal fibre structure and the melt film. In the case of identical thermoplastics for precursor impregnation and coating it is of course also possible to apply to aliquot of the coating thermoplastic or the total amount of thermoplastic in the form of a melt.

It is of course also possible to carry out the two steps individually or in succession on double-belt presses. It is thus possible not only for the production of the precursor but also for the coating to be carried out alone on a double-belt press.

The double-belt press, if fed with the thermoplastics in the form of films, has at least one heating zone and one cooling zone. The heating temperature must be at least as high as the glass transition temperature in the case of amorphous thermoplastics and at least as high as the crystal melt temperature in the case of partly crystalline thermoplastics. In the cooling zone, the web of composite material is cooled down at least to such an extent that it no longer sticks to the belt.

If the inner thermoplastic is applied in the form of a melt and the outer in the form of a film it is possible to work the process using a single temperature zone set at the maximum to a temperature at which the composite material in the process of take-off does not adhere to the belt.

Particular preference is given to a process carried out on a preferably heatable calender comprising at least one pair of rolls. Here an aliquot or the total amount of the coating thermoplastic is drawn in as a film on the surfaces of the rolls, while the metal fibre structure is drawn in together with thermoplastic melt in the slot thus lined with thermoplastic films. Film thickness and heating temperature have to be chosen in such a way that adequate impregnation of the metal fibres with thermoplastic and good bonding between film and melt are effected and adhesion to the calender rolls is prevented.

It is of course also possible to use batchwise processes on static intermittent presses or multi-daylight presses, into which the thermoplastics are preferably introduced in film form.

If the composite material is initially obtained in a sheetlike form, it can first of all for example be divided in the longitudinal direction into strips of the desired width which can then be granulated. Granulation is particularly advantageous with a cube dicer. The dividing can be effected for example mechanically via cutting means or by means of a water jet or by means of laser beams.

In other possible processes the plastic is applied from solution, suspension or latex. This requires first of all the removal of solvents or suspension media. In particular from the solution it is possible to obtain thin impregnating layers and hence high metal fibre contents in the precursor. Plastics powders can be applied for example by fluidized bed sintering or powder spraying. The coating is effected by the specified process steps, for example in a heated die, a calender or a continuous or batchwise press with simultaneous compaction of the precursor.

Thermoplastics may also be present in the form of fibres or film tapes, for example in the form of mixed fibre bundles or of blend textiles composed of metal and plastics fibres.

Figure 1:
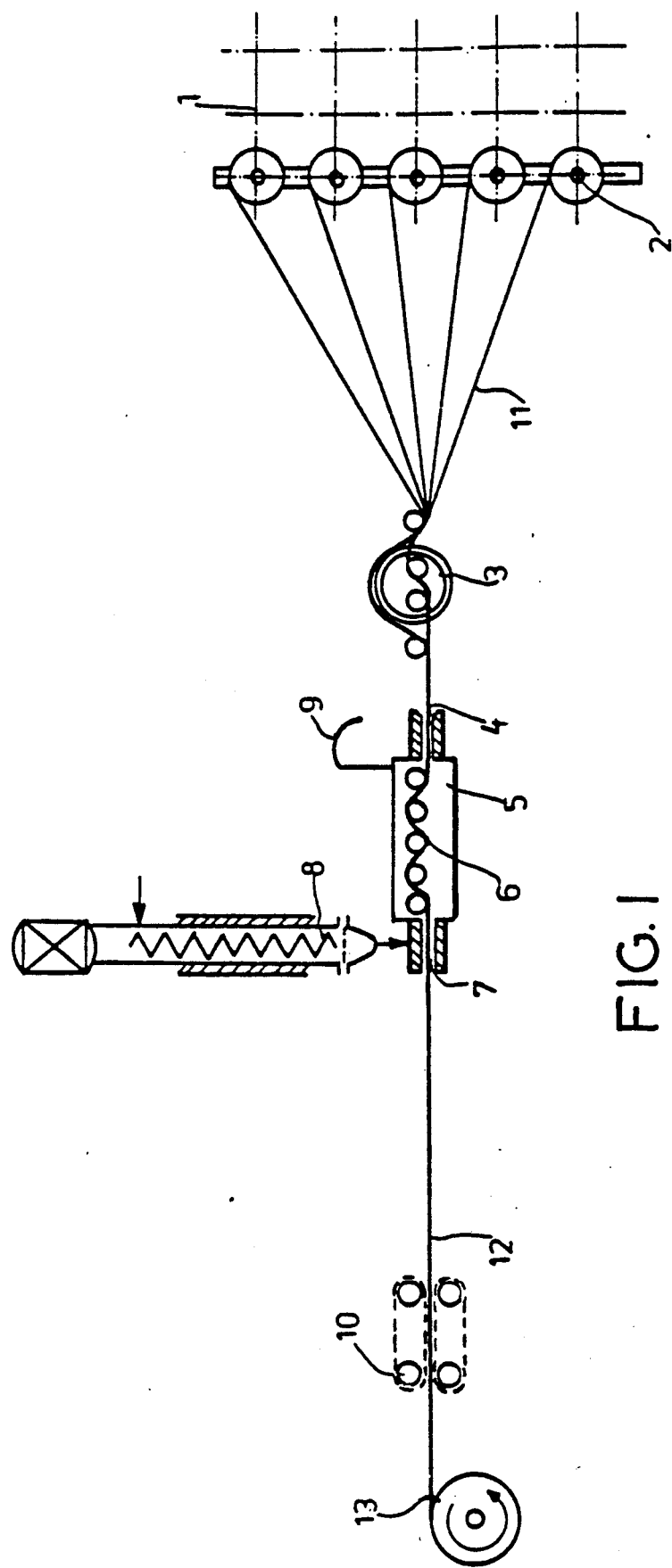
FIG. 1 shows a possible process for carrying out the impregnating. On a creel 1 the metal fibres 11 are taken off bobbins or warp beams 2. From 20 to 3,000, preferably from 50 to 1,200, individual fibres are used. This is followed by an alignment and orientation in an only schematically indicated roller system 3 by known processes of textile technology. The flat ribbon is then introduced through a slot die 4 into a melt-filled chamber 5 where the actual impregnating is carried out, for example by deflection by means of pins 6 or other suitable impregnating systems. A subsequent shaping die 7 gives the ribbon its final, preferably round or rectangular, cross-sectional shape. The thermoplastic is applied for example in countercurrent by means of an extruder 8, the excess being withdrawn at the other end via line 9. A take-off system, preferably a ribbon take-off system 10, pulls the precursor 12 through the installation. It is followed for examle by a wind-up means 13.

If the polymerization or crosslinking is carried out directly on the metal fibre surface, this results in the technical advantage that the impregnation of the metal fibre structure can first be effected in a low-viscosity, comparatively low molecular weight starting substance. To effect impregnation it is possible to use apparatus as depicted in FIG. 1, in which case the lower viscosity makes possible a higher production speed or better impregnation. In the case of thermoplastics, the polymerization takes place between shaping die 7 and take-off 10 in a heated delay time zone.

Since thinner surface layers can be produced with a low-viscosity impregnating medium, it is also conceivable to use the metal fibres coated with crosslinked thermosetting plastics in the thermoplastic range.

In addition to the metal fibres the precursor material may also contain reinforcing fibres of any kind, for example glass fibres.

The precursor material produced by this process step in various possible apparatus is enveloped in a second process step with another, thermoplastic matrix. The envelope can be carried out in any desired way. For example, any process suitable for impregnating metal fibres can be employed. Also possible is a sheathing with thermoplastics by the reaction injection moulding process.

Suitable matrix materials for enveloping the precursor are all desired thermoplastic polymers in undiluted form, in the form of a solution, in the form of a dispersion or in the form of films. It is also possible to use monomers and other intermediates of these polymers. It is advisable to use for the enveloping a material having a lower viscosity than the polymer used for the impregnation. In general, the difference in viscosity should be $\Delta \epsilon = 20$ Pa.s. Examples of such thermoplastics are:

olefine and polyolefine homopolymers, graft polymers and copolymers, for example polyethylene, polypropylene, polybutene, polyisobutylene, PVC, ethylene vinyl acetate polymers, fluorine-containing polymers, polyacetals, polystyrene, styrene copolymers, aromatic, aliphatic and mixed polyesters, polyamides and polyimides, polyethers, polycarbonates, polyurethanes, polyureas and other polymers obtainable by the polyisocyanate polyaddition process, polyacrylates, polyphenylene oxide, polysulphides, PPS, polysulphones, polyethane sulphones, polyethane ketones, polyethane ester ketones. Even blends or mixtures of these polymers are possible without restriction. The polymers may also contain further additives such as plasticising agents, antioxidants, mould release agents, waxes or other polymer additives as described for example in E. W. Flick:

Plastics Additives, Noyes Publications, Park Ridge, N.J., USA. The thermoplastics to be used according to the invention may also contain solid substances of any desired type and composition; these can be organic or inorganic and for the purposes of the present invention are simply referred to as fillers. Examples of such substances are:

carbonates such as chalk or dolomite, silicates such as talc, kaolin, mica, wollastonite etc., silicon dioxide, aluminium oxide, aluminium trihydrate, carbon black, graphite, coal and the like, glass fibres, glass balls, ground rock, hollow glass balls, reinforcing fibres such as, for example, glass, carbon, graphite and polymer fibres, silicon carbide and nitride, aluminium titanate and also other powders for ceramic production, molybdenum sulphide, zinc sulphide, zinc oxide, organic and inorganic pigments, various metal oxides, metal powders and fibres, metallized fibres and other metallized fillers, fly ash, microballoons, $TiO_2$, cements, MgO, $Mg(OH)_2$, boron, silicon and the like. It is also possible for a plurality of solids to be present side by side, for example titanium dioxide and a pigment or a combination of glass balls and glass fibres.

The reinforcing fibres can be present in the form of rovings, yarns, threads, or ropes in continuous filament or staple fibre form. They can also be incorporated into sheetlike composite materials in textile form, for example in the form of continuous filament mats, chopped strand mats, woven fabrics or knitted fabrics, and after cutting the composite core according to the invention contains corresponding proportions.

The fillers can be amoprhous or crystalline, solid, porous or hollow and have for example the shape of powders, balls, platelets, needles, dumb-bells or fibres.

They are mixed in a conventional manner with the matrix materials specified hereinafter in amounts of 0.1–90, preferably 0.5–60, particularly preferably 5–50, % by weight.

The selection of the polymers for producing the composite materials according to the invention is simple, and the person skilled in the art needs but few experiments to be in a position to produce the best possible composite material for the desired purpose. The use of different substances in the impregnation of the metal fibres and in the subsequent enveloping confers particular advantageous properties on the composite materials according to the invention in the course of their further processing into mouldings giving a screening effect. By selecting suitable impregnating/enveloping materials it is ensured that the metal fibres are protected during injection moulding or whichever other processing technique; that is, they are not damaged or damaged to a significantly lesser extent than in the prior art; and that they become distributed in the moulding in a surprisingly uniform manner.

The blocking of injection nozzles is prevented and damage to the injection moulding machine by metal abrasion is solely or substantially eliminated.

This is because it is a further characteristic feature of the composite materials according to the invention that they contain a compact region which is rich in metal fibres and which has the effect that the complete and uniform mixing of the fibres with the enveloping polymer and the attendant shear stress does not take place until a later phase of processing, i.e. when an optimum plastic state has been obtained for the envelope polymer. This ensures a particularly gentle incorporation of the metal fibres.

The composition of the composite materials according to the invention also substantially prevents any segregation of the impregnated metal fibres and the thermoplastic matrix, which would lead to pronounced inhomogeneities in the moulding.

Typical examples of polymer combinations which can be used for producing the precursor and/or the sheathing thereon are for example polyamide/thermoplastic granules and polycarbonate polymers:

nylon 66/nylon 6, nylon 66/glass fibres-containing nylon 6, nylon 66/polycarbonate, polycarbonate/polyamide, polyamideimide-nylon 66/polycarbonate, polyester, nylon 6, nylon 6/polycarbonate.

Further combinations can easily be derived from the abovementioned impregnating and/or enveloping materials.

The composite materials according to the invention preferably have a metal fibre content of 20–70% by volume in the precursor and 2–30% by volume in the composite.

The composite materials obtained by the process according to the invention can be cut immediately following the sheathing of the precursor into lengths of 1–70, preferably 3–40, mm. Examples of such composite materials are shown in FIG. 2. However, they can also be initially produced as continuous composite materials and not be granulated until before the particular use. The composite materials according to the invention are directly suitable for producing mouldings and/or films giving a screening effect against electromagnetic radiation by injection moulding, by extruding or by calendering. They can also be used for compounding.

Even if the composite materials according to the invention are used in the production of screening mouldings in admixtures with pure polymers which may differ from those used in the production of the composite materials, they are particularly preferably used directly. This is because the particular advance in the art represented by the composite materials according to the invention is that they possess the most suitable metal fibre/polymer ratio for every screening duty. This ensures as a result a reproducible production of mouldings containing a desired, substantially constant proportion of metal fibres. The screening moulding can be produced in a single process step; that is, there is no need for pre-compounding which would subject the metal fibres to shearing and hence damage them.

The shaped articles obtainable by means of the composite materials according to the invention have in general a metal content of 1–30% by volume and a screening effect at 27 MHz of more than 15 dB (magnetic component, near field).

The surface and volume resistance of the mouldings according to German Standard Specification DIN 53482 is in general more than $10^5$ .cm.

The product designations mentioned in the examples which follow are in some instances registered trademarks.

EXAMPLE 1

In an impregnating unit according to FIG. 1, 1,000 m of a strip having the cross-sectional dimension 4 mm×0.8 mm. The matrix materials used was nylon 6.6 (Bayer-Durethan A 30 S). 500 copper wires 50 $\mu$m in diameter (manufacturer: Harländer und Schmidt, Roth near Nuremberg) were taken off 5 warp beams 100 filaments at a time. The ribbon obtained contained 30.7% by volume or 77.9% by weight of copper. One meter of the ribbon weighed 11.3 g.

The ribbon was enveloped in a wire-sheathing extruder with various amounts of nylon 6 (Durethan B 305, Bayer AG) and then cut into portions 15 mm in length.

EXAMPLE 2

Example 1 was repeated, except that the enveloping material used comprised polycarbonate polymers (Makrolon 2400 (Example 2A) and 2800 (Example 2B), Bayer AG).

EXAMPLE 3

Example 1 was repeated, except that the enveloping material used was glass fibre-reinforced polyamide (Durethan BKV 15, Bayer AG).

EXAMPLE 4

Example 1 was repeated, except that the metal wires were impregnated with polycarbonate (Makrolon 2800, Bayer AG).

EXAMPLE 5

Example 1 was repeated, except that the impregnating was carried out with nylon 6 (Durethan B 30 S, Bayer AG) and the enveloping with polycarbonate (Makrolon 2400, Bayer AG).

EXAMPLE 6

Example 1 was repeated, except that the impregnating was carried out with a polycarbonate (Makrolon 2800, Bayer AG) and the sheathing with a polymer blend of acrylonitrile-butadiene-styrene and polycarbonate (Bayblend T 65 MN, Bayer AG).

EXAMPLE 7

Example 1 was repeated, except that 800 copper wires and a polyphenylene sulphide matrix were used. This produced a ribbon having a copper content of 49.0% by volume or 88.5% by weight. The ribbon weighed 15.8 g/m and was enveloped with nylon 6 (Durethan B 30 S, Bayer AG) in such a way as to give a composite material containing 30% by weight of copper; this composite material was cut into portions 10 mm in length.

EXAMPLE 8

Example 1 was repeated, except 1,000 copper wires were used and polycarbonate (Makrolon 2800) was used as matrix material. This produced a ribbon containing 61.3% by volume or 92.7% by weight of copper. The ribbon weighed 18.9 g/m and was enveloped with a nylon 6 matrix in such a way as to give a composite material containing 32% by weight of copper; this composite material was cut into portions 15 mm in length.

EXAMPLE 9

Example 1 was repeated to produce a round cross-section strip 3 mm in diameter using hot-galvanized copper wires 100 μm in diameter (manufacturer: Lacroix und Kress, Klasing, Bramsche). 500 wires in a nylon 6.6 matrix gave a copper content of 55.5% by volume or 90.7% by weight. The strip weighted 38.6 g/m and was enveloped with nylon 6 in such a way as to produce a composite material having a metal content of 30% by weight; this composite material was cut into portions 15 mm in length.

EXAMPLE 10

Example 1 was followed to produce a strip 4.5 mm×0.5 mm in cross-sectional dimensions using 1,000 copper wires 40 μm in diameter and a nylon 6.6 matrix, resulting in a copper content of 31.7% by volume of 78.7% by weight of a weight of 8.0 g/m. This ribbon was sheathed with nylon 6 (Durethan B 30 S) in such a way as to produce a composite material containing 27% by weight of copper, this composite material being subsequently cut into portions 15 mm in length.

EXAMPLE 11

Example 1 was repeated, except that the impregnating was performed using a liquid crystal polymer (LCP) (experimental Bayer product KU 1-9220). In this case, 31.7% by volume corresponded to 75.3% by weight for a ribbon weight of 8.4 g/m. The ribbon was enveloped with nylon 6 (Durethan B 30 S) in such a way as to produce a composite material containing 29% by weight of copper, which was subsequently cut into portions 15 mm in length.

EXAMPLE 12

Example 1 was repeated, except that a 1,200 tex glass fibre roving was additionally incorporated into the strip. After enveloping with nylon 6 the composite material contained 25% by weight of copper.

EXAMPLE 13

Example 1 was repeated, except that the enveloping material used was polycarbonate (Makrolon 2400). The length of the composite material according to the invention was 7 mm.

EXAMPLE 14

Example 1 was repeated, except that the metal wire used was a silverized copper wire from Harländer und Schmidt 59 μm in diameter. 500 wires produced in the nylon 6.6 matrix a copper content of 42.7% by volume or 85.6% by weight. The ribbon weighed 14.3 g/m and was enveloped with various amounts of nylon 6 (Durethan B 30 S) and then cut into portions 15 mm in length.

Application Examples

EXAMPLE 15

The composite materials produced as described in Examples 1-14 were processed by injection moulding into mouldings whose screening effect with respect to the magnetic near field is illustrated hereinafter. The screening values given conform to the standards NSA-No 65-6 and US-MIL-STD 285 (distance from transmitter screen: about 50 mm, perforated disc 80 mm in diameter, boxes 200×100×60 mm).

TABLE 1

| Composite material according to Example | Metal content of moulding (% by weight) | Screening (dB) at MHz | | | | | | | |
|---|---|---|---|---|---|---|---|---|---|
| | | 0.1 | 1 | 3 | 5 | 10 | 20 | 30 | 27.12 | 100 |
| 1 | 18 | 4 | 20 | 27 | | 32 | | | 33 | |
| | 29 | 12 | 29 | 39 | | 48 | | | 54 | |
| | 37 | 15 | 34 | 44 | | 49 | | | 56 | |
| 2 A | 26 | 1 | 8 | 16 | | 23 | | | 28 | |
| | 30 | 2 | 13 | 21 | | 28 | | | 36 | |
| | 33 | 3 | 16 | 24 | | 33 | | | 42 | |
| | 36 | 4 | 20 | 29 | | 38 | | | 50 | |
| | 39 | 4 | 21 | 30 | | 40 | | | 53 | |
| 2 B | 40 | 4 | 21 | 32 | | 42 | | | 53 | |
| 3 | 23 | 4 | 18 | 24 | | 30 | | | 33 | |
| | 31 | 11 | 29 | 39 | | 48 | | | 53 | |
| 4 | 26 | 4 | 17 | 25 | | 32 | | | 38 | |
| | 35 | 9 | 27 | 36 | | 47 | | | 50(a) | |
| 5 | 20 | 0.1 | 2 | 3 | | 6 | | | 11 | |
| | 24 | 0.3 | 5 | 11 | | 17 | | | 23 | |
| | 31 | 2 | 13 | 22 | | 29 | | | 40 | |
| | 37 | 3 | 16 | 24 | | 34 | | | 42(a) | |
| | 41 | 4 | 20 | 30 | | 40 | | | 47(a) | |
| 6 | 18 | 4 | 17 | 25 | | 31 | | | 34 | |
| | 24 | 7 | 23 | 33 | | 42 | | | 55 | |
| | 26 | 8 | 24 | 36 | | 47 | | | — | |
| | 29 | 12 | 30 | 42 | | 48 | | | — | |
| | 40 | 15 | 36 | 47 | | — | | | — | |
| 7 | 30 | — | — | — | | — | | | 32 | |
| 8 | 32 | — | — | — | | — | | | 39 | |
| 9 | 30 | — | — | — | | — | | | 29 | |
| 10 | 27 | — | — | — | | — | | | 37 | |
| 11 | 29 | — | — | — | | — | | | 33 | |
| 12 | 25 | — | — | — | | — | | | 49 | |
| 13 | 33 | 3 | 15 | | 27 | 33 | 40 | — | | — |
| 14 | 8 | 0.3 | 4 | | 8 | 10 | 10 | 10 | | 12 |
| | 13 | 3 | 14 | | 20 | 22 | 24 | 25 | | 27 |
| | 17 | 4 | 17 | | 26 | 27 | 30 | 30 | | 32 |
| | 42 | 24 | 46 | | 47 | 48 | 48 | 48 | | >60 |

(a) at 20 MHz

We claim:

1. A metal fiber-containing composite material in which the fibers of said composite material are in substantially parallel alignment and wherein said composite material is obtained by impregnating a bundle of continuous metal filament fibers having an average diameter of 35-200 μm with one or more polymeric adhesion-promoting substances to form a compact precursor, sheathing or coating the compact precursor with a thermoplastic polymer matrix to form an extrudate of composite material and cutting the extrudate of composite material into lengths of 1-70 mm.

2. A composite material according to claim 1, wherein the polymer(s) for the impregnation and that for the sheathing are different from one another.

3. A composite material according to claim 1, wherein the bundle of continuous metal filament fibers is made of Cu, Ag, Fe, Ni, Co or alloys thereof, including with other metals, or two- or multi-layer combinations thereof and wherein the proportion of metal fibers is 20-70% by volume in the compact precursor and 1-30% by volume in the composite material.

4. A composite material according to claim 1, wherein the impregnating of the bundle of continuous metal filament fibers is effected with thermoplastic melt via pins or rollers which deflect the fiber bundle being impregnated.

5. A composite materials according to claim 1, wherein the impregnating of the bundle of continuous metal filament fiber and coating of the compact precursor are each independently carried out in a double-belt press, an intermittent press or a calendar.

6. A composite materials according to claim 1, the compact precursor is coated in sheetlike form having widths between 2 and 2,000 mm on one or both sides with thermoplastic.

7. A composite material according to claim 1, wherein sheathing or coating of the compact precursor is carried out by using polyamides, polyimides, polycarbonate, polyurethanes, polyureas or other polymers obtainable by the polyisocyanate polyaddition process, polyesters, polyolefins, their copolymers and/or graft copolymers, polyacrylates, polyphenelene sulphide, polyethers, styrene-butadiene acrylonitrile (co)polymers, ethylene vinyl acetate copolymers, polyacetals or any desired blends or mixtures of these polymers to form the thermoplastic polymer matrix.

8. A process for producing moldings for screening against electromagnetic radiation comprising injection molding of composite materials according to claim 1.

9. A process according to claim 8, wherein the composite materials are used together with metal-free polymer pellets as master batches.

10. A process according to claim 8, wherein the metal content in the molding is 1-30% by volume, the screening effect at 27 MHz is >15 dB and the surface and volume resistance according to German Standard Specification DIN 53486 are >$10^5 10^6$ cm.

* * * * *

UNITED STATES PATENT AND TRADEMARK OFFICE
CERTIFICATE OF CORRECTION

PATENT NO. : 5,137,766

DATED : August 11, 1992

INVENTOR(S) : Mazanek et al.

It is certified that error appears in the above-indentified patent and that said Letters Patent is hereby corrected as shown below:

Col. 8, line 56  Delete " $10^5$.cm. " and substitute -- $10^5 \Omega$cm. --

Col. 12, last line  Delete " $10^5 106$ cm. " and substitute -- $10^5 \Omega$cm. --

Signed and Sealed this

Fourth Day of January, 1994

Attest:

BRUCE LEHMAN

*Attesting Officer*  *Commissioner of Patents and Trademarks*